United States Patent [19]

Schlichte

[11] 4,270,211
[45] May 26, 1981

[54] SYSTEM FOR SYNCHRONIZING EXCHANGES OF A TELECOMMUNICATIONS NETWORK

[75] Inventor: Max Schlichte, Munich, Fed. Rep. of Germany

[73] Assignee: Siemens Aktiengesellschaft, Berlin & Munich, Fed. Rep. of Germany

[21] Appl. No.: 945,565

[22] Filed: Sep. 25, 1978

[30] Foreign Application Priority Data

Sep. 26, 1977 [DE] Fed. Rep. of Germany ....... 2743252

[51] Int. Cl.³ ............................................ H03K 1/17
[52] U.S. Cl. .................... 375/107; 375/120; 331/1 A
[58] Field of Search ............ 331/1 R, 1 A, 10, 11; 178/53, 69.1; 179/15BS; 325/58; 375/107, 118, 119, 120; 370/100, 108; 455/51

[56] References Cited

U.S. PATENT DOCUMENTS

| 3,109,897 | 11/1953 | Carbrey | 178/53 |
| 3,879,676 | 4/1975 | Schulz et al. | 331/10 |

Primary Examiner—Benedict V. Safourek
Attorney, Agent, or Firm—Hill, Van Santen, Steadman, Chiara & Simpson

[57] ABSTRACT

A telecommunications network arranged in a hierarchical manner establishes synchronism between operation of pulses at different locations within the network, by sensing a predetermined phase deviation between a master pulse train and a locally produced pulse train, correcting the deviation by adjusting the phase of the locally produced pulse train, determining the time between required corrections of the phase of the locally produced pulse train, and adjusting the control voltage of the master oscillator for the locally produced pulse train in response to the time interval between successive corrections of the phase of the locally produced pulse train.

11 Claims, 3 Drawing Figures

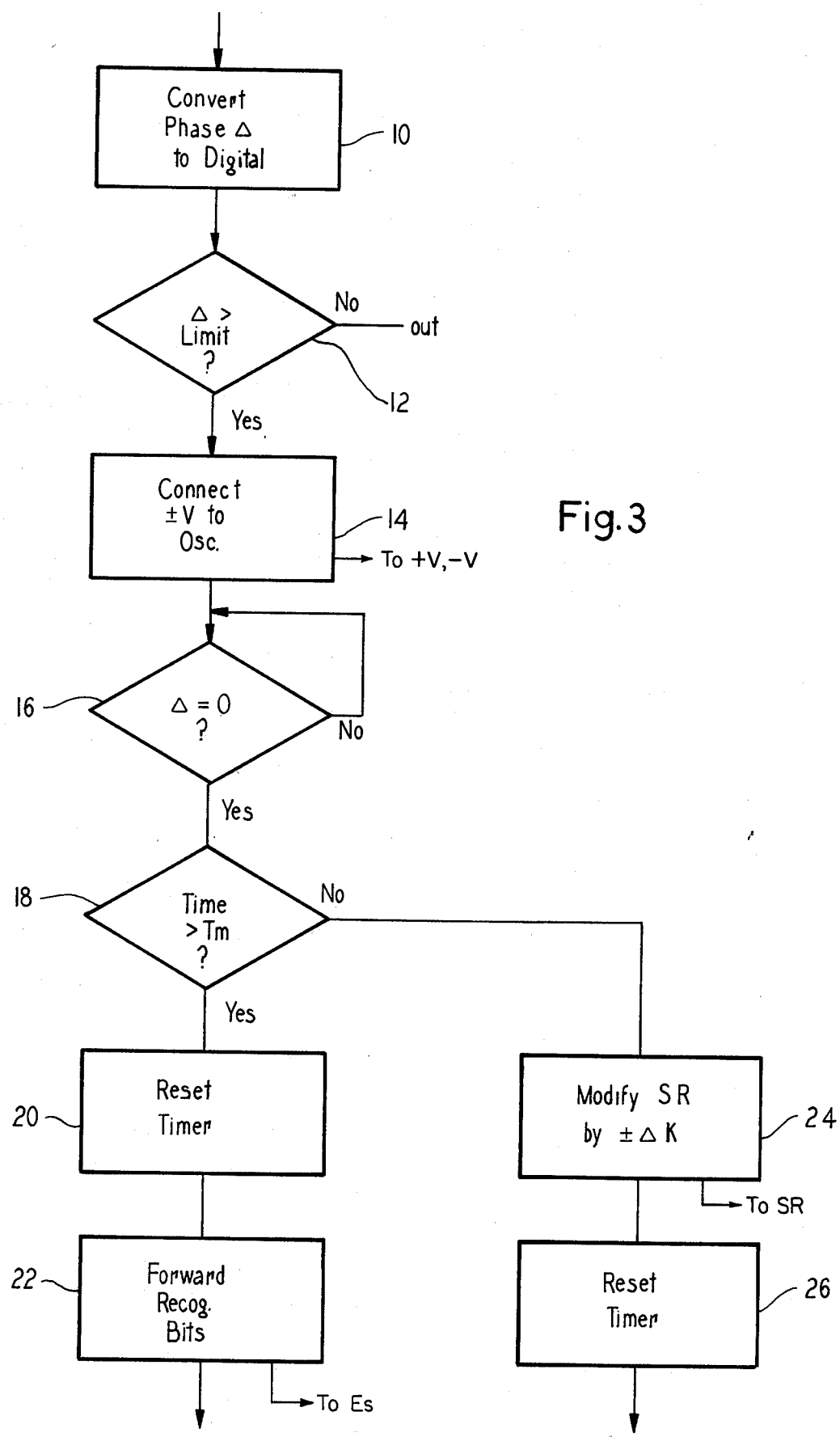

SYSTEM FOR SYNCHRONIZING EXCHANGES OF A TELECOMMUNICATIONS NETWORK

BACKGROUND

1. Field of the Invention

The present invention relates to methods and apparatus synchronizing exchanges of a telecommunications network, and in particular, a telecommunications network having communications carried out in pulse code.

2. The Prior Art

In a telecommunications network employing pulse code transmission of data, synchronization is necessary in order to insure satisfactory operation of the exchanges. it is necessary to have the bit rate incoming to an exchange agree with the bit rate which is determined by the local pulse generator within the exchange. it is necessary to eliminate slight phase fluctuations or jitters which arise on the transmission links, and in PCM telecommunications networks, it is necessary to carry out a so-called pulse frame compensation in order that all the time channels bearing the same ordinal number within the relevant pulse frame in the incoming and outgoing directions may coincide with one another in time.

A master-slave process of synchronization requires a central pulse generator with a high degree of accuracy. When the communications network is intact, no information losses occur with this type of synchronization. In the event of breakdown of the central pulse generator, in order to avoid or minimize information losses, it is necessary to provide substitution facilities for the central pulse generator or else the synchronized pulse generators within the exchanges must be sufficiently accurate to insure that they will not vary far from the desired pulse repetition rate until after a sufficiently long operating duration.

In addition to master-slave processes, two other processes are known in the prior art which allow prompt processing of switched information. In one case, the entire network can be operated asynchronously, in which case the individual pulse generators operate independently of each other, yet each possesses a relatively high frequency accuracy, so that the frequency of the individual pulse generators does not differ greatly. A buffer store is provided at the input of each of the exchanges to compensate for the phase difference between the pulse train of the incoming transmission line and the locally produced pulse train. This method leads to the disadvantage that, because of limited storage capacity of the buffer, it is sometimes necessary to suppress the entire storage contents or to read out the contents of the buffer a second time, with the result that a slip loss is introduced. Such slip losses also exist in master-slave systems where the central pulse generator becomes inoperative and no substitute pulse generator is provided.

Another system for maintaining network synchronization consists of the so-called phase averaging process. When this method is used, the pulse generators of the individual exchanges each have equal priority and are mutually synchronized together. Then the standard network frequency corresponds approximately to the mean value of the individual frequencies of all of the local pulse generators. No slip losses occur within such a network, although disturbances can impair the stability of the overall network. This makes it necessary to divide up large networks into smaller portions, so that individual portions then operate asynchronously with respect to each other, giving rise to the slip losses which are typical of asynchronous systems. In order to minimize slip losses in the phase averaging process, the pulse generators must possess a high degree of accuracy. The accuracy requirement lies between the accuracy required for the asynchronous network (approximately $10^{-10}$) and that required for the master-slave process ($10^{-9}$). However, such accuracies are available only by means of relatively expensive pulse generators having a frequency standard based on atomic phenomena.

BRIEF DESCRIPTION OF THE PRESENT INVENTION

It is a principal object of the present invention to provide a synchronizing process which employs lower quality pulse generators than those required in the prior art, while maintaining low rates of slip loss.

In accordance with one illustrative embodiment of the invention, this object is realized in a master-slave process by recognizing when a predetermined phase deviation occurs between pulses produced by a central pulse generator and the locally produced pulses at the exchange. The phase of the locally produced pulse train is adjusted when it exceeds a predetermind rate, by the temporary connection of a maximum or minimum tuning voltage, until phase synchronization has been achieved. The time between successive phase corrections of this type is measured, and when this duration is less than a predetermined value, an adjustment is made in the frequency of the local oscillator. New frequency adjustment is made when the duration exceeds a predetermined interval.

The process of the present invention is not carried out continuously, but only when the deviation in phase has exceeded a given limit. By use of the present invention, the accuracy requirements of the oscillators for producing the locally generated pulse trains are substantially lower than in previously known synchronizing processes.

In accordance with a further embodiment of the present invention, in a telecommunications network in which the exchanges are arranged in a hierarchical fashion, after the phase of a locally produced pulse train has been corrected, a recognition bit is gated into a message word transmitted from a local exchange to a further exchange. Recognition bits are inhibited when the frequency of the locally produced pulse train is in need of correction, in order to insure that the only recognition bits which arrive at the subsequent exchange are those which are in the correct phase relationship.

The logical operations which must be carried out in order to perform the processes of the present invention are expediently performed by the central control unit or processor of the exchange.

BRIEF DESCRIPTION OF THE DRAWINGS

Reference will now be made to the accompanying drawings in which:

FIG. 3 is a flow chart illustrating steps which are carried out, and apparatus employed, during operation of the process of the present invention.

DESCRIPTION OF THE PREFERRED EMBODIMENT

Figure 2:
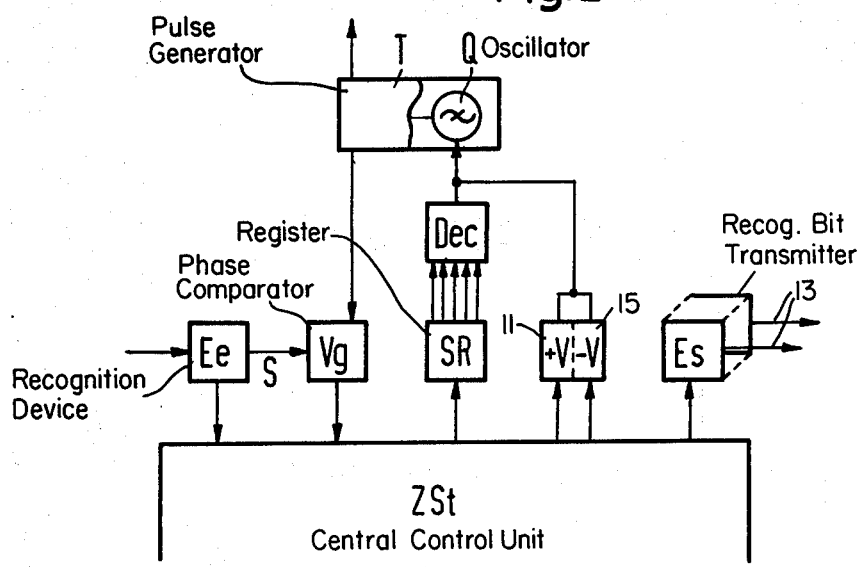
FIG. 2 is a functional block diagram of an exemplary embodiment of apparatus for carrying out the process of FIG. 1.

Referring to FIG. 2, each of the exchanges within the telecommunication network incorporates a pulse generator T. It produces a train of pulses, and the train of pulses is supplied to the input of a phase comparator circuit Vg. A second input S to the phase comparator circuit Vg is derived from a recognition device Ee which produces a signal S in recognition of a signal transmitted from a point located remotely from the exchange, which may be the location of the most precise pulse generator in the system. The signal S which is recognized by the recognition unit Ee is typically transmitted between two pulse code words from a preceding exchange.

The pulse generator T incorporates a crystal oscillator Q, as its frequency determining element, and the pulse train produced by the pulse generator T is typically produced by several stages of frequency dividers (not shown) driven by the crystal oscillator Q. Although the frequency of the crystal oscillator Q is determined mainly by the crystal employed, it may be raised or lowered by a small amount in accordance with an input control voltage. Normally, the control voltage is derived from a digital quantity stored in a register SR, the output of which is decoded in a decoder Dec to produce a voltage for controlling the frequency of the crystal oscillator within a small range.

The control input of the crystal oscillator Q is also connected to a source of positive voltage 11 and a source of negative voltage 12, as illustrated in FIG. 2, and when one or the other of these voltage sources is connected, the frequency of the oscillator is raised, or lowered, respectively, by a maximum quantity.

The phase comparator circuit Vg supplies an output to the central control unit ZSt of the exchange, which preferably consists of a microprocessor or the like, and is synchronized by an output from the unit Ee. The control unit ZSt examines the magnitude of the phase difference produced by the phase comparator Vg. If the phase difference exceeds a predetermined quantity, the control unit Zst connects either the positive source 11 or negative source 12 of voltage to the control input of the crystal oscillator Q, for varying the frequency of the crystal oscillator by a small amount in such a way as to permit the phase of the pulse train produced by the pulse generator T rapidly to come back into synchronism with the phase of the signal S. When phase equality has been achieved, the control unit ZSt disengages the voltage supply, and permits the oscillator Q to continue to function at the frequency established by the voltage output of the decoder Dec.

Figure 1:
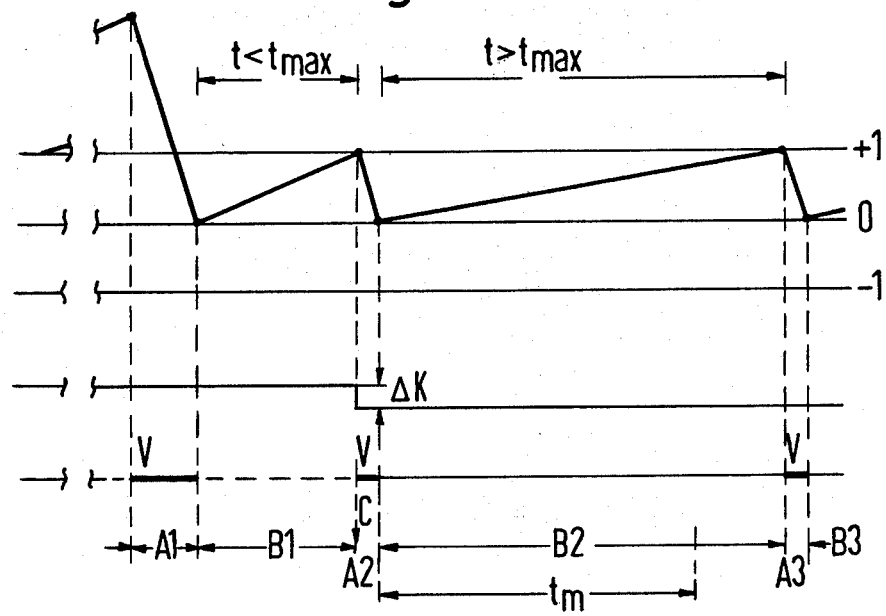
FIG. 1 is a series of wave forms illustrating the operation of a process incorporating the present invention.

This operation is illustrated in FIG. 1, which shows during a time period A1, the rapid reduction of the phase difference from a relatively high value to zero. This is the time during which the voltage V was connected, under control of the central control unit ZSt, to the control input of the crystal oscillator Q.

Following the period A1, the difference between the phase of the signal S and the pulse train produced by the pulse generator T rises until a maximum value is reached, indicated in FIG. 1 by the line labeled +1. At this time another correction is effected, in the same way as described above, bringing the phase difference back to zero.

means is provided within the central control unit ZSt for measuring the interval B1, and for performing one of two different operations, depending on the magnitude of B1. If the magnitude of B1 exceeds a predetermind interval, the accuracy of the pulse train produced by the pulse generator T is established, and recognition bits are supplied by a units Es over lines 13 to subsequent exchanges. The predetermined interval is indicated in FIG. 1 as the interval $T_m$, which is exceeded by the interval B2 between successive phase corrections.

If the interval B1 is less than the quantity $T_m$, the quantity stored in the register SR is modified, so that a different steady state voltage is supplied to the control input of the crystal oscillator Q by the decoder Dec, and no recognition bit is produced by the unit Es. Otherwise, recognition bits are supplied to the output lines 13. This insures that recognition bits produced by the unit Es and which are employed by subsequent exchanges for correcting the phase of their pulse generators, occur only at times during which the pulse generator T is producing signals of the appropriate frequency and phase. The amount of frequency deviation $\Delta f$ from the ideal is expressed by $$\Delta f = (\Delta t/t) \cdot f$$

where $\Delta t$ is the time shift characterizing the maximum permissible phase shift, t equals B1, and f is the instantaneous frequency of the oscillator Q. In one embodiment, the time shift $\Delta t$ amounts to the time interval corresponding to one bit width, and is therefore 488 nsec. in a system incorporating 32 time channels with 8 bits each, using a pulse frame period of 125 msec. The adjustment value which must be added to or subtracted from the quantity stored in the register SR then amounts to $$\Delta k = -(\Delta f/s)$$

where s is the regulation gradient of the pulse generator T.

The register SR is supplied with a quantity which is greater than, or less than, the previously stored quantity in SR, in accordance with whether the frequency of the crystal oscillator Q must be raised or lowered in order to stay in phase with the signal S over a greater length of time. Successive additions or subtractions may be made to the quantity stored in the register SR if necessary in order to bring about correspondence in phase between the signal S and the pulse train generated by the pulse generator T. FIG. 1 illustrates that following the time period B1, the quantity $\Delta k$ modifies the contents of the register SR, reducing the control voltage supplied to the crystal oscillator Q, and bringing about a frequency which insures that the pulse train produced by the generator T does not beecome out of phase with the signal S by more than a predetermined amount until after an interval V2 which is longer than the predetermined time Tm.

The length of the time interval Tm is dependent upon the accuracy of the crystal oscillators which are used, and upon the permissible phase deviation limit, and on the permissible slip losses.

In a telecommunications network which has hierarchical construction, in which recognition bits are forwarded only when the locally generated pulse trains are in phase with the received signals, if it is assumed that on the average a connection runs through N exchanges, and the frequency deviations at the exchanges differ by the quantity $\pm \Delta$ fmax from a common mean value fm, and such deviations are equally distributed among the exchanges, the mean value of the slip rate is $$fsl = \frac{2(N-1) \cdot fmax}{3fm \cdot Tp}$$

where Tp is the buffer time of the buffer store arranged at the input of the exchanges. With a buffer time equal to 125 μs (1 pulse frame period) and N equal to 5, then $$fsl = 21.3 \cdot 10^3 \cdot \frac{\Delta fmax}{fm}$$

If it is permitted on the average to slip once per 24 hours, i.e., lose the content of one buffer store, and assuming within that length of time the cause of the interruption of the correct transmission of the synchronization criterion produced by the master pulse generator has been eliminated, the crystal oscillators within the individual exchanges must possess a stability over a period of 24 hours of $$(\frac{fmax}{fm}) \cdot 24\,h = 0.54 \cdot 10^{-9}$$

Available crystal oscillators having a 24 hour stability of $10^{-10}$ fulfill these requirements. Where a predetermined time duration Tm is selected to be shorter than the maximum length of time required for the phase of the locally generated pulse train to depart from the ideal phase by ±1 bit, it is insured that the given limit for the slip rate is adhered to, even when the crystal oscillator deviates from its original characteristics as a result of aging.

Referring now to FIG. 3, a flow chart of steps performed during operation of the process described above is illustrated. The flow chart incorporates operational units which are represented as rectangles, and decision units which are represented as diamonds. The operational units and decision units correspond to apparatus which is well-known to those skilled in the art, and so the contents of these units need not be described in detail. The operational units and the decision units may be embodied either in the form of discrete devices, or in portions of a microprocessor system. In the latter case, some of the units such as timers, comparators, etc., are embodied in the form of software routines performed by the processor unit.

The first step performed as illustrated in FIG. 3 is the converting of the phase difference to a digital signal. This is performed by unit 10, which then passes control to a unit 12. The unit 12 determines whether a predetermined limit has been exceeded by the phase difference, and if it has not, no further steps need be performed. If the limit has been exceeded, control passes to a unit 14, which applies +V or −V to the oscillator control terminal, the sign of the voltage being determined by the sign of the phase difference. Control then passes to the unit 16 which determines when the phase difference has been reduced to zero, after which control passes to the unit 18, which inspects the state of the timer, which was set at the time of the last phase correction, to determine whether it exceeds the predetermined interval Tm. If not, the unit 20 resets the timer to begin a new timing operation, and control then passes to unit 22 which enables the forwarding of recognition pulses to the next exchange. This continues until the next comparison is made, at which time control is returned to the unit 10.

If the unit 18 determines that the timer has exceeded the predetermined limit, control passes to the unit 24, which modifies the quantity stored in the register SR by +Δk or −Δk, the sign depending on the sign of the phase difference. Then unit 26 resets the timer, for the purpose of timing the interval to the next required phase correction. No recognition pulses are forwarded until after a subsequent phase correction enables the unit 20 to receive control, insuring that recognition pulses are forwarded only when the frequency of the locally generated pulse train is known to be correct.

In the above description, the periodic adjustments of phase are temporary in nature, by momentarily applying +V or −V. The adjustments of the frequency, by modifying the contents of SR are of longer duration, and may be permanent, lasting until modified the next time the interval between phase corrections exceeds the quantity Tm, a condition which is relatively rare. Therefore, the application of +V or −V briefly to correct the phase may be referred to as a phase correction while the alteration of the contents of SR may be referred to as a frequency correction.

The present invention may advantageously be used in PCM networks.

In a typical embodiment of the present invention, the frequency f is about 2048 MHz. The value of Tm is dependent on the accuracy of the crystal oscillators used, and on the permissible phase deviation limit and on the permissible slip losses. In a typical example, it may be about one second. The value for s, the regulation gradient, may be about $10^{-10}$.

The so-called recognition bits which are forwarded to subsequent or down stream exchanges are synchronizing signals, and are used by those exchanges for synchronizing purposes in the same way as described above. When such a recognition bit is to be transmitted, it may be gated into a message word transmitted to the subsequent exchanges between successive synchronizing signals received from a central pulse generator or from a previous or upstream exchange.

From the foregoing, it is apparent that the present invention allows a simple and relatively inexpensive system for insuring synchronization among the various exchanges of a telecommunications network. By the use of the present invention, a very precise synchronization is possible, even with the use of relatively inexpensive and less stable oscillators. It will be apparent to those skilled in the art that various additions and modifications may be made in the system of the present invention without departing from the essential features of novelty thereof, which are intended to be defined and secured by the appending claims.

What is claimed is:

1. For use in a telecommunications network having a central pulse generator and a plurality of exchanges, each of said exchanges having a local tuneable pulse generator for supplying timing pulses, a method of synchronizing said tuneable pulse generators, comprising the steps of:
   determining when the difference in phase between a signal from said central pulse generator and a signal locally generated by a tuneable pulse generator exceeds a predetermined quantity,
   subsequently changing the phase of the locally generated signal by applying a tuning voltage for rapidly correcting its phase to eliminate said phase difference,
   determining the time interval between two successive occasions at which the difference in phase between the locally generated signal and the signal from the central pulse generator exceeds said quantity,
   determining whether said time interval exceeds a predetermined interval, and if said predetermined interval has not been exceeded, adjusting the frequency of said locally produced signal and thereafter maintaining the frequency of said locally produced signal as so adjusted until the next time the said predetermined interval is exceeded by said time interval.

2. The method according to claim 1, wherein said exchanges are arranged in hierarchical fashion, including the step of transmitting a synchronizing signal to another exchange following said phase correction.

3. The method according to claim 2, wherein said network is a PCM network, and said synchronizing signal comprises a recognition bit gated into a message transmitted between two signals from said central pulse generator.

4. The method according to claim 1, wherein the steps of the method are performed at the site of said local pulse generator.

5. In a telecommunications network having a plurality of exchanges, each of said exchanges having a tuneable pulse generator for supplying timing pulses, the method of synchronizing the pulse generators of each of said exchanges with an incoming synchronizing signal, comprising the steps of:
determining when the phase difference between the signal produced by said exchange pulse generator and said incoming synchronizing signal exceeds a predetermined quantity,
correcting the phase of the signal produced by said exchange pulse generator until said phase difference has been eliminated,
timing the interval beginning with said phase correction until the difference between said incoming signal and the signal from said exchange pulse generator again exceeds said predetermined level,
making a permanent adjustment in the frequency of said exchange pulse generator when said interval is less than a predetermined interval,
and repeating said correcting, timing and adjusting steps, modifying said permanent adjustment each time the interval between phase corrections is less than said predetermined interval.

6. The method according to claim 5, wherein said phase correction is performed by temporarily applying a phase shifting voltage, poled to eliminate said phase difference, and disconnecting said phase shifting voltage when said phase difference has been eliminated.

7. The method according to claim 5, wherein said exchange pulse generator includes a voltage controlled oscillator and means for manifesting a voltage for controlling said oscillator, and wherein said correction step comprises adjusting the quantity manifested by said manifesting means for effecting a corresponding adjustment in the frequency of said oscillator.

8. The method according to claim 15, including the steps of selectively transmitting synchronizing signals to another exchange during periods following a phase correction which had followed the last preceding phase correction by more than said predetermined interval.

9. For use in synchronizing signals generated locally within an exchange of a telecommunications network, the combination comprising:
means for locally generating a timing signal,
means for determining when said locally generated signal differs in phase from an incoming synchronizing signal by more than a predetermined quantity,
means for rapidly correcting the phase of said locally generated signal until said phase difference is eliminated,
timing means for timing the interval beginning with said phase correction until said phase difference again exceeds said predetermined amount, and
means responsive to said timing means for adjusting the frequency of said locally generated signal, subsequent to said phase correction, when the time between successive phase corrections does not exceed a predetermined interval.

10. Apparatus according to claim 9, including means responsive to said timing means for transmitting synchronizing signals to other exchanges within said network when the time between successive phase corrections exceeds said predetermined interval.

11. Apparatus according to claim 9, including a voltage controlled oscillator for generating said timing signal, a register for storing a representation of a control voltage for controlling said oscillator, and means response to said timing means for adjusting the quantity in said register when successive phase corrections are separated by less than said predetermined interval.